(12) United States Patent
Knezevic et al.

(10) Patent No.: US 8,310,185 B2
(45) Date of Patent: Nov. 13, 2012

(54) CORRECTION OF COUNTING ERRORS IN THE EVALUATION OF CURRENT RIPPLES IN A DC MOTOR

(75) Inventors: Jovan Knezevic, Bamberg (DE); Wolfgang Uebel, Weitramsdorf (DE)

(73) Assignee: Brose Fahrzeugteile GmbH & Co. KG, Hallstadt (DE)

( * ) Notice: Subject to any disclaimer, the term of this patent is extended or adjusted under 35 U.S.C. 154(b) by 0 days.

(21) Appl. No.: 13/235,335

(22) Filed: Sep. 16, 2011

(65) Prior Publication Data
US 2012/0091938 A1  Apr. 19, 2012

Related U.S. Application Data

(63) Continuation of application No. PCT/EP2010/001635, filed on Mar. 16, 2010.

(30) Foreign Application Priority Data

Mar. 16, 2009 (DE) .......................... 10 2009 013 062

(51) Int. Cl.
*H02P 6/16* (2006.01)

(52) U.S. Cl. .......... 318/400.12; 318/400.13; 318/400.23

(58) Field of Classification Search ............. 318/400.12, 318/400.13, 400.23, 400.2, 400.16, 400.27, 318/400.07, 400.08, 400.01, 400.04, 798, 318/470; 388/815
See application file for complete search history.

(56) References Cited

U.S. PATENT DOCUMENTS

| 5,744,921 A | 4/1998 | Makaran |
| 2006/0138982 A1 | 6/2006 | Marty |
| 2011/0270558 A1* | 11/2011 | Knezevic et al. ............... 702/65 |
| 2012/0062156 A1* | 3/2012 | Uebel et al. .............. 318/400.12 |

FOREIGN PATENT DOCUMENTS

| DE | 41 35 873 A1 | 4/1993 |
| DE | 20 2004 010 211 U1 | 9/2005 |
| DE | 10 2006 049 123 A1 | 4/2008 |

* cited by examiner

*Primary Examiner* — Karen Masih
(74) *Attorney, Agent, or Firm* — Muncy, Geissler, Olds & Lowe, PLLC (57) ABSTRACT

A method for detecting a regulating variable of a mechanically commutated DC motor in a positioning device for a motor vehicle is provided. The DC motor has a standard ripple pattern, which contains per engine cycle or semi-cycle at least one index ripple, which is classified with regard to amplitude, duration and/or time position. The counter-electromotoric power is calculated from a measured motor current and the measured motor voltage by a motor model. An alternating element corresponding to the current ripples is extracted from the counter-electromotoric power, which in turn is used to determine the current ripples. Further, in at least one engine cycle or engine semi-cycle the index ripple is identified and the total identified current ripples are counted. The result of the count is hereby corrected when the index ripple is not counted at the expected position.

10 Claims, 3 Drawing Sheets

CORRECTION OF COUNTING ERRORS IN THE EVALUATION OF CURRENT RIPPLES IN A DC MOTOR

This nonprovisional application is a continuation of International Application No. PCT/EP2010/001635, which was filed on Mar. 16, 2010, and which claims priority to German Patent Application No. DE 10 2009 013 062.4, which was filed in Germany on Mar. 16, 2009, and which are both herein incorporated by reference.

BACKGROUND OF THE INVENTION

1. Field of the Invention

The invention relates to a method for determining an actuating quantity of a mechanically commutated DC motor (commutator motor). The invention additionally relates to a device for carrying out the method, and to the use of a modified commutator motor for such a method.

2. Description of the Background Art

Commutator motors are oftentimes used as actuating motors within an actuating device for or in a motor vehicle. Such actuating devices are, for example, an electric power window regulator, an electric seat adjustment mechanism, an electric door or sunroof closing mechanism.

In these actuating devices (actuating systems), precise knowledge of the instantaneous actuation position, travel distance, and/or actuation speed is required, in particular to be able to travel precisely to an end position that is to be reached for an actuating operation, and to be able to detect hazard situations, such as a pinch event, in a timely manner. The actuation position and quantities derived therefrom, such as the actuation speed and the actuation distance traveled, are jointly referred to below as "actuating quantities." Each of these actuating quantities can be defined in an equivalent manner with respect to the motor, to the motor vehicle part to be moved, or to another component of the actuating device moved during the actuation process. For example, the actuation position in a power window regulator can be specified in an equivalent manner by the angle of rotation of the motor shaft or the window position. Similarly, the actuation speed can be specified in an equivalent manner by the speed of the motor shaft or the travel speed of the window, etc.

In methods operating without sensors—such as is known from for example, DE 10, 2006 049 123 A1, which corresponds to US Publication No. 20100315032, actuating quantities of the above-mentioned type are typically determined by counting the motor current ripples. In this context, (motor current) ripple designates a characteristic ripple (i.e., periodic, pulsating variations) of the motor current that is caused by the commutation of the DC motor.

However, error-free counting of the motor current ripples is not possible in all phases of a typical actuation process. Thus, a typical actuation process is made up of an initial startup phase, an equilibrium phase (steady state), a freewheeling phase, and a final braking phase.

During the startup phase, the motor speed settles to a stable final speed. In the subsequent equilibrium phase, this final speed and hence also the frequency of the current ripples is approximately constant.

The freewheeling phase is initiated in that both terminals of the commutator motor are switched to ground in order to terminate the actuation process. The freewheeling phase lasts for the duration of this switching process (typically approximately 3-4 msec). As a result of the switching process, either no motor current or an extremely irreproducible motor current flows during the freewheeling phase, with essentially unchanged actuation speed of the motor. As soon as both motor contacts are switched to ground in a stable manner, the freewheeling phase transitions to the final braking phase. In the braking phase, the electric motor, which is short-circuited through ground, is operated as a generator and is braked by the circulating current thus produced.

As a result of the collapsing motor current, it is impossible to count the current ripples in the freewheeling phase, in particular. Ripple counting is indeed possible in principle during the startup and braking phases, but suffers an increased risk of error on account of comparatively irregular current relationships.

In conventional methods for ripple counting, this is why counting errors in ripple counting typically occur during the freewheeling phase in particular, but to a lesser degree in the startup phase and the braking phase as well. Such counting errors occur primarily because current ripples in the current signal are not detected and thus are essentially "lost." Furthermore, however, counting errors can also occur because externally caused disturbances in the motor current behavior are incorrectly identified as current ripples. Both types of counting errors result in errors determining the actuating quantities. Especially during calculation of the actuation position, these errors can accumulate in an unfavorable manner during the course of several successive actuation processes, and thus can significantly impair the function of the actuating device under certain circumstances.

A method is known from DE 20 2004 010 211 U1, which corresponds to U.S. Pat. No. 7,741,800, which is incorporated herein be reference, and in which, in order to correct counting errors in the ripple count, pattern recognition is first carried out, during the course of which characteristic amplitude differences are identified in the successive ripples within a motor cycle. As a result of this identification of the individual ripples in the motor cycle, "lost" or incorrectly identified ripples can be detected and the count result can be corrected accordingly. It is additionally proposed in DE 20 2004 010 211 U1 to also ascertain the motor position by means of an electromechanical motor model in parallel with the ripple counting.

It is known furthermore from DE 41 35 873 C2, which corresponds to U.S. Pat. No. 5,432,421, and which is incorporated herein by reference, to produce an irregular ripple pattern—within one ripple cycle—through modification of a commutator motor in order to be able to detect not just the travel position or travel distance or the travel speed by means of the ripple pattern, but also the direction of travel.

SUMMARY OF THE INVENTION

It is therefore an object of the invention to provide an easy-to-implement and failsafe method for determining an actuating quantity, in particular a travel position or travel speed of a commutator motor, by counting motor current ripples. The method should allow, in particular, an easy-to-implement and failsafe correction of errors in ripple counting. The invention has the additional object of specifying a device that is especially suitable for carrying out the method.

According to an embodiment of the method, a mechanically commutated (DC) motor is used within the actuating device, which motor has, as a result of appropriate mechanical or electromechanical modification, a standard ripple pattern that includes at least one index ripple in each motor cycle or motor half cycle that is distinguished with respect to amplitude, duration, and/or position in time (which is to say, deviating significantly from the majority of the remaining ripples of the motor cycle or motor half cycle). During operation of this motor, the back electromotive force (also called back electromagnetic force, BEMF for short, or counter-electromotive force) is calculated from the measured motor current and the measured motor voltage by means of a motor model. An AC component corresponding to the current ripples is extracted from the BEMF. The current ripples, in particular their times and amplitudes, are detected from this AC component of the BEMF.

According to the method, the index ripple is now identified on the basis of its previously known distinguishing features (in other words, deviating characteristics), preferably in each motor cycle or half cycle. In addition, all identified current ripples are counted. The count result, which represents a measure of the actuating quantity to be ascertained or the change therein, is corrected in this design by an appropriate number of count units when the index ripple is not identified (counted) at the expected position, but rather at a position shifted with respect thereto.

The "standard ripple pattern" is defined as the ripple pattern that the motor exhibits in steady-state, undisturbed operation as a result of its unique design. A "motor cycle" is defined in general as the section of a motor signal, in particular of the motor current, BEMF, or ripple pattern, that corresponds to one complete rotation of the motor shaft. Accordingly, a "(motor) half cycle" is defined as the section of the relevant motor signal corresponding to half a rotation of the motor shaft. The standard ripple pattern repeats periodically with each motor cycle or half cycle. And this is why the index ripple, or each index ripple, appears many times in periodic repetition. In particular, this causes each motor cycle or motor half cycle to have a "signature," which is to say a repeated appearance of the index ripple.

The total number of current ripples contained in the standard ripple pattern in each cycle or half-cycle of the motor, including the index ripple, is referred to below as the "cycle ripple count" ($N_Z$).

The "motor model" used in the method is a mathematical formula, in particular of the form:

$$E = U_m - R_a \cdot I_a - L_a \cdot \frac{dI_a}{dt},$$ Eq. 1 or a circuit module or program module implementing such a formula. In equation 1, E represents the back electromotive force (BEMF) measured in units of an electric voltage, $U_m$ represents the motor voltage present at the motor contacts, $R_a$ represents the ohmic motor resistance, $I_a$ represents the electric motor current flowing between the motor contacts, or more precisely, the current amplitude of the same, and $L_a$ represents the inductance of the motor.

The quantities E, $U_m$ and $I_a$ are time-dependent measured quantities, which is to say they are functions of time. The quantities $R_a$ and $L_a$ are device constants of the commutator motor.

The inventive method has the advantage, in particular, that the deviating characteristics of the index ripple are known in advance as a result of the motor modification, and thus are predefined for carrying out the method. Identification of the index ripple is thus especially simple. In a useful embodiment, this takes place using predefined threshold values for the amplitude of the index ripple and/or for the time interval between the index ripple and the preceding or subsequent ripple, for example. Numerically intensive real-time pattern recognition is superfluous here, and in particular is omitted as a result. As a result of the extraction of the current ripples from the BEMF calculated by means of the motor model (and not directly from the motor current), the count result here is also unaffected, or at least is affected to only a very small degree, by disturbances in the supply voltage. Consequently, errors in the count result caused by such disturbances are largely precluded from the outset.

In a variation of the method that is especially undemanding numerically, the correction is carried out only once per actuation process, in particular after completion of the actuation process. In an especially precise, yet more numerically demanding, alternative variation of the method, the correction is carried out at each identification of the index ripple. In this way, any count errors are corrected essentially in real time at each motor revolution or even half-revolution.

For a preferred variation of the method, a motor is used that is modified in such a manner that its standard ripple pattern has precisely (which is to say, only) one index ripple per motor cycle or motor half cycle. In this variation of the method, the number of current ripples between two successive signatures of the index ripple is ascertained. This number is referred to below as the "index ripple count" ($N_I$). By definition, the signatures of the index ripple are not counted during determination of the interval ripple count. As is known, in the absence of counting errors, the interval ripple count thus determined must correspond to the cycle ripple count reduced by one count unit, which is to say:

$$N_I = N_Z - 1$$ Eq. 2

This is used according to the method for detecting and correcting counting errors, in that the count result determined as a measure for the actuating quantity or the change therein is corrected upward by one count unit, which is to say is increased, when the interval ripple count corresponds to the cycle ripple count decreased by two count units ($N_I = N_Z - 2$), and is corrected downward by one count unit, which is to say is decreased, when the interval ripple count corresponds to the cycle ripple count ($N_I = N_Z$).

In an embodiment, the motor has four current ripples per motor cycle or half-cycle ($N_Z = 4$), with only one of these being an index ripple. In this case, the count result will thus be corrected upward by one count unit when only two counts are present between two successive signatures of the index ripple, an be corrected downward by one count unit when four counts are present between two successive signatures of the index ripple.

Of course, the "interval ripple count" in the above-described variation of the method can also be determined in an alternative definition while counting one or both signatures of the index ripple. In this case, the above conditions must be adapted accordingly.

In another variation of the method, the number of current ripples between the signature of the index ripple identified in an earlier motor cycle or motor half cycle and the signature of the index ripple identified in a later motor cycle or motor half cycle is determined in general as the "interval ripple count". Generally speaking, the earlier and later motor cycle or motor half cycle can be chosen freely here. In a preferred embodiment, however, the first motor cycle or half cycle is chosen as the earlier motor cycle or half cycle, and the last motor cycle of an actuation process is chosen as the later motor cycle or half cycle. By definition, here, the signature of the index ripple in the later motor cycle or half cycle is included in the count for determining the interval ripple count.

As is known, in the absence of counting errors, the interval ripple count thus defined must always correspond to the cycle ripple count or an integer multiple thereof. In other words, the fractional part ($V_{NK}$) of the ratio of the interval ripple count to the cycle ripple count must always be zero in the absence of counting errors, while a nonzero fractional part of this ratio indicates a counting error.

In an embodiment of the method, the count result that is determined as a measure of the actuating quantity or the change therein is corrected upward, which is to say increased, by the product of the fractional part and the cycle ripple count ($V_{NK} \cdot N_Z$) when the said fractional part is at least 0.5. In contrast, when the fractional part is greater than 0 but less than 0.5, this count result is corrected downward, which is to say decreased, by the product of the fractional part and the cycle ripple count.

In the case of four current ripples per motor cycle or half-cycle ($N_Z=4$), the fractional part of the above-defined ratio will in particular always have the value 0.75 or 0.5 when one or two current ripples have not been counted, so that, in this case the count result is increased by the corresponding number of count units, and the value 0.25 when one current ripple too many has been counted, so that in this case the count result is decreased by one count unit.

In addition to the count error correction described above, in a preferred variation of the method the count result ascertained as a measure of the actuating quantity or the change therein is adapted during the freewheeling phase of each actuation process through linear or nonlinear extrapolation using the current ripples identified before and/or after the freewheeling phase.

The above object is also achieved by a device with the features of claim 7. This device includes a control unit (in particular in the form of a microcontroller) in which the above-described method is implemented (in particular by software).

The object is additionally achieved by the features of claim 9, namely by the use of a commutator motor modified to produce a ripple pattern with a distinguished index ripple in order to correct counting errors in detecting an actuating quantity of the motor by counting current ripples, in particular within the framework of the method described above.

Preferably the motor is modified in such a manner that, in its ripple pattern, the distinguished index ripple is followed by at least two "ordinary" ripples that are clearly distinguishable therefrom, and/or in that the distinguished index ripple is preceded by at least two "ordinary" ripples that are clearly distinguishable therefrom. In the case of four ripples per half cycle, a ripple pattern having a single distinguished index ripple ("1") and three "ordinary" ripples ("0") is preferred: 1:0:0:0.

The motor can include one of multiple rotor windings with a reduced or increased number of turns. In the case of four rotor windings, these have a turns ratio of 23:25:25:25, in particular. In another, preferred embodiment, the motor is wound with eight rotor windings that have a turns ratio of 26:24:25:25:27:26:25:25. However, within the scope of the invention the commutator motor may also be modified in any of the ways described in DE 41 35 873 C2.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Corresponding parts and quantities are labeled with the same reference characters in the figures.

Figure 1:
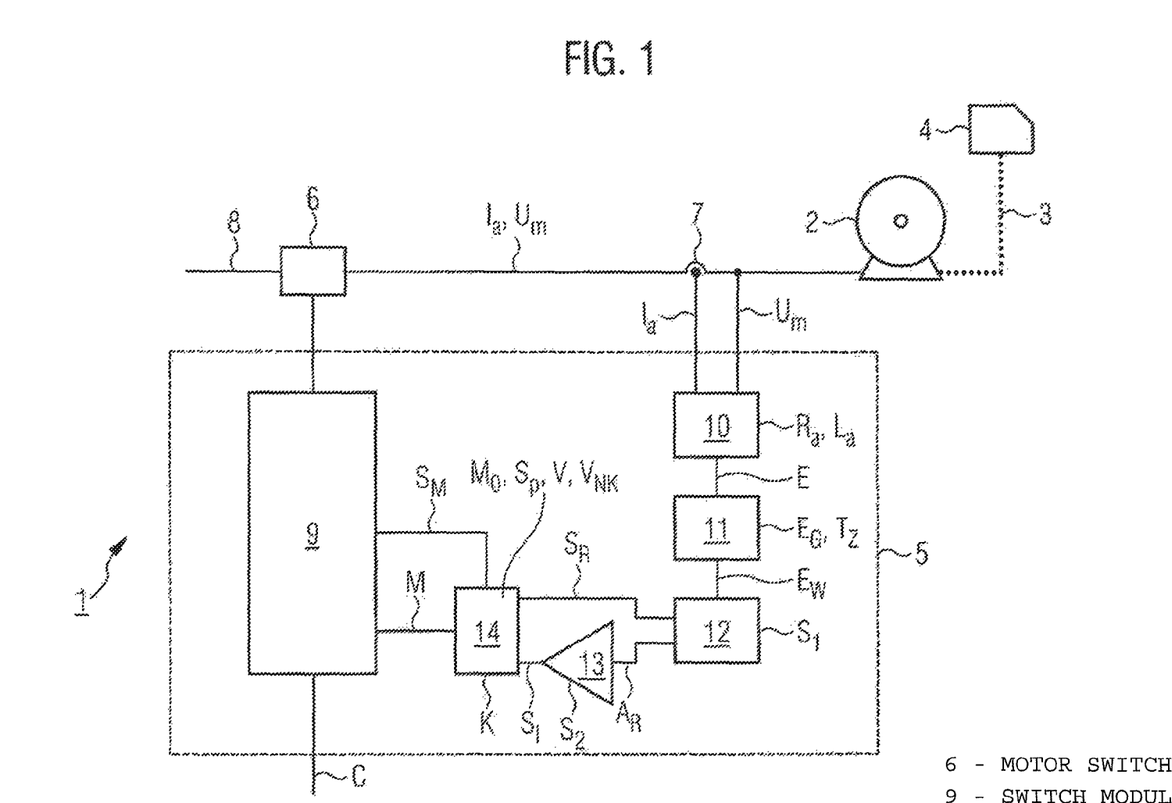
FIG. 1 is a schematic block diagram of an actuating device for a motor vehicle, with a mechanically commutated DC motor, and with a control unit for controlling the motor that is designed to identify a motor position by counting the current ripples of the motor current and automatically correcting any counting errors in doing so.

By way of example, the actuating device 1 shown schematically in FIG. 1 is an electric power window regulator, such as is customarily used in a passenger vehicle. The actuating device 1 includes a mechanically commutated (DC) motor 2, which acts, on a (motor vehicle) window 4 by means of an actuating mechanism 3 (merely indicated) and reversibly moves said window between an open position and a closed position.

The actuating device 1 also includes a control unit 5, a motor switch 6, and a current sensor 7.

The current switch 6 is connected in a (two-phase) power supply line 8 for the motor 2. It includes two independently drivable individual switches, the switching positions of which can be used to selectably connect the two motor terminals to the positive pole or the negative pole (ground) of the power supply line 8. By appropriately setting the individual switches of the motor switch 6, the motor 2 can thus be switched on and off in each of its two directions of motion and can be reversed in polarity to switch the direction of motion.

The current sensor 7 is, in particular, a measurement resistor across which a voltage proportional to current can be tapped as a measurement signal for the motor current $I_a$ flowing in the power supply line 8. For purposes of simplification, this measurement signal is also referred to below as the "motor current $I_a$," since it represents a measure of the amplitude thereof. In this regard, the current sensor 7 supplies the motor current $I_a$, or more precisely the measurement signal that is characteristic of the motor current $I_a$, to the control unit 5 as the input quantity. The motor voltage $U_m$ present in the power supply line 8 is supplied to the control unit 5 as an additional input quantity (in the sense of a measured quantity).

The control unit 5 serves to control the motor 2 by appropriate actuation of the motor switch 6. To this end, it includes a switch module 9 that operates the motor switch 6 as a function of external control commands C and a motor position signal M. The motor position signal M is an actuating quantity—arbitrarily definable as a general rule—from which the position of the window 4 can be derived. The motor position signal M here can be defined, in particular, as the angle of rotation of the motor 2 (in units of angular measurement). In a preferred embodiment of the device 1, however, the motor position signal M is generated as a dimensionless number that results from counting the current ripples R (FIGS. 3 and 4) of the motor current $I_a$ in a manner described in detail below. The control unit 5 is designed here to automatically correct any counting errors in counting the current ripples R.

In order to determine the motor position signal M, including the counting error correction, the control unit 5 includes something known as a motor model 10, an (AC component) filter 11, a (current ripple) detection module 12, an (index ripple) detection module 13, and an analysis module 14.

In a preferred embodiment of the actuating device 1, the control unit 5 is composed of a microcontroller. In this design, the switch module 9, motor model 10, filter 11, and modules 12 through 14 are implemented, in particular, in the form of software modules, which is to say functional components of software implemented in the microcontroller. Alternatively, however, the control unit 5 can also be implemented as an analog and/or digital electrical circuit, wherein the switch module 9, motor model 10, filter 11, and modules 12 through 14 are implemented in the form of electrical circuits. Furthermore, mixed forms are possible in which the components of the control unit 5 are implemented partly through a circuit and partly through software.

Moreover, the above division of the components of the control unit 5 has merely a functional character. In particular, these components can be arbitrarily combined into larger circuit or program units, or subdivided still further.

A mathematical formula of the form given in Equation 1 is implemented in the motor model 10—either by programming or the circuit—through which the back electromotive force (BEMF), which was already introduced above, can be calculated as a function of the motor current $I_a$ and the motor voltage $U_m$. The motor current $I_a$ and the motor voltage $U_m$ are supplied to the motor model 10 as input quantities. The parameters of the motor model 10, namely the ohmic (motor) resistance $R_a$ and the (motor) inductance $L_a$, are predefined as constants for the motor model 10. The electromotive force E calculated using Equation 1 is output by the motor model 10 to the filter 11 that follows.

The time-dependent, varying value of the BEMF E is additively composed of a DC component $E_G$ that does not vary over time or varies only slightly, and an AC component $E_W$ that varies rapidly over time:

$$E_W = E - E_G. \quad \text{Eq. 3}$$

Figure 3:
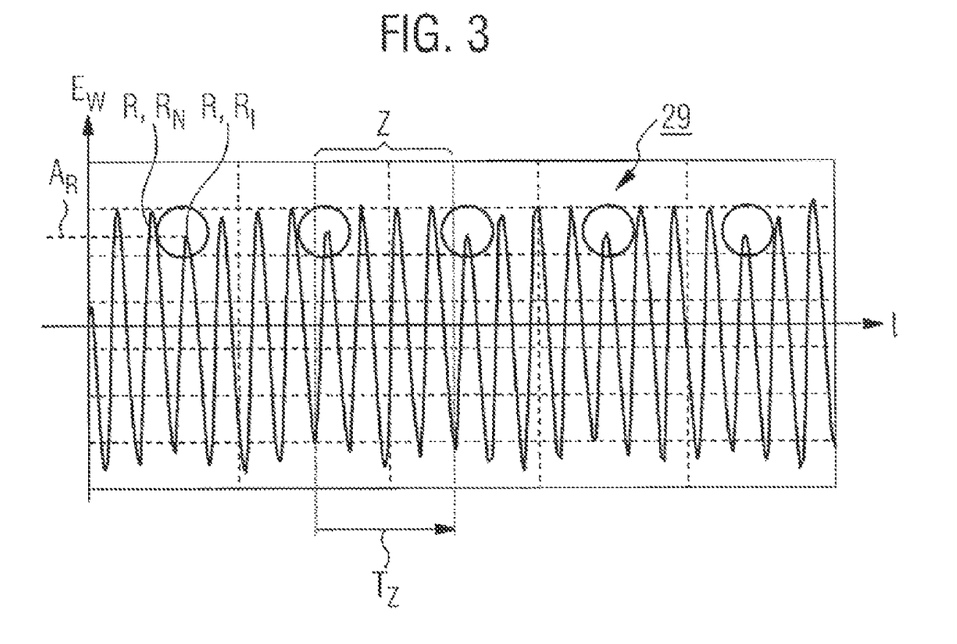
FIG. 3 is a schematic diagram of an AC component of the back electromotive force (BEMF) over time of a standard ripple pattern of the DC motor, which, as a result of an electromechanical modification of the DC motor, namely a fractional armature winding, includes for each half-cycle of the motor one index ripple that is distinguished with regard to its amplitude and three additional current ripples that are not distinguished.

In this context, the component of the BEMF E that does not vary over time or varies only slightly is defined, in particular, as the component that does not vary significantly on the typical time scale of a (motor) half cycle Z (FIG. 3). In a design using programming, the filter 11 is preferably composed of an algorithm that calculates the DC component $E_G$ by a moving time average calculation over the BEMF E for the duration of a half cycle Z (half-cycle period $T_Z$), in particular according to $$E_G = \frac{1}{T_Z} \cdot \int_{T_Z} E \cdot dt, \quad \text{Eq. 4}$$

and that calculates the AC component $E_W$ according to equation 3 by subtracting the DC component $E_G$ from the BEMF E. The filter 11 forwards the ascertained AC component $E_W$ to the current ripple detection module 12.

In this context, the control unit 5 can calculate the half-cycle period $T_Z$ from the change over time of the motor position signal M, and can supply its current value in each case to the filter 11. In a design that is preferred for simplicity's sake, the half-cycle period $T_Z$ can be predefined as a constant for the filter 11, however. In particular, this constant is selected here in such a manner that its value corresponds to the average half-cycle period $T_Z$ of the motor 2 in its steady-state operation.

In a design using a circuit, the filter 11 can alternatively be designed as a high-pass filter.

As is known, current ripples R of the motor current $I_a$ are reflected in an oscillation of the BEMF E, and in particular its AC component $E_W$, that is synchronous therewith. Therefore, the detection module 12 is designed to detect maxima in the time behavior of the AC component $E_W$ as an indicator for the occurrence of a current ripple R. In order to avoid erroneous detection of current ripples R resulting from high-frequency interference in the behavior of the AC component $E_W$ as much as possible, however, the AC component $E_W$ is optionally smoothed before the search for maxima. In addition or alternatively hereto, and for the same purpose, during the maximum value search the detection module 12 only takes into account values of the AC component $E_W$ that exceed a predefined threshold $S_1$ which is set relatively low. The AC component $E_W$ is thus divided into a number of separate time sequences for which the condition $E_W > S_1$ is met (in FIG. 4 these sequences are highlighted by thicker line widths), wherein the detection module 12 ascertains the global maximum of the AC component $E_W$ within each of these sequences.

Upon detecting each maximum in the AC component $E_W$, the detection module 12 outputs a ripple detection signal $S_R$ to the analysis module 14. In addition, the detection module 12 ascertains the amplitude, of the AC component $E_W$ at the point of the maximum and communicates this amplitude to the index ripple detection module 13 as the ripple amplitude $A_R$.

The detection module 13 compares the ripple amplitude $A_R$ with a second predefined threshold value $S_2$, and outputs an index ripple detection signal $S_I$ to the analysis module 14 when the ripple amplitude $A_R$ falls below the threshold $S_2$. Using the ripple detection signals $S_R$, the index ripple detection signal $S_I$, and a motor status signal $S_M$ supplied by the switch module 9, the analysis module 14 then determines the motor position signal M in a manner described in detail below.

The motor status signal $S_M$ has the value +1 as long as the motor 2 is operated in a first direction of motion, and the value −1 as long as the motor 2 is operated in the opposite direction of motion. In contrast, the motor status signal $S_M$ has the value 0 when the motor 2 is switched off.

Figure 2:
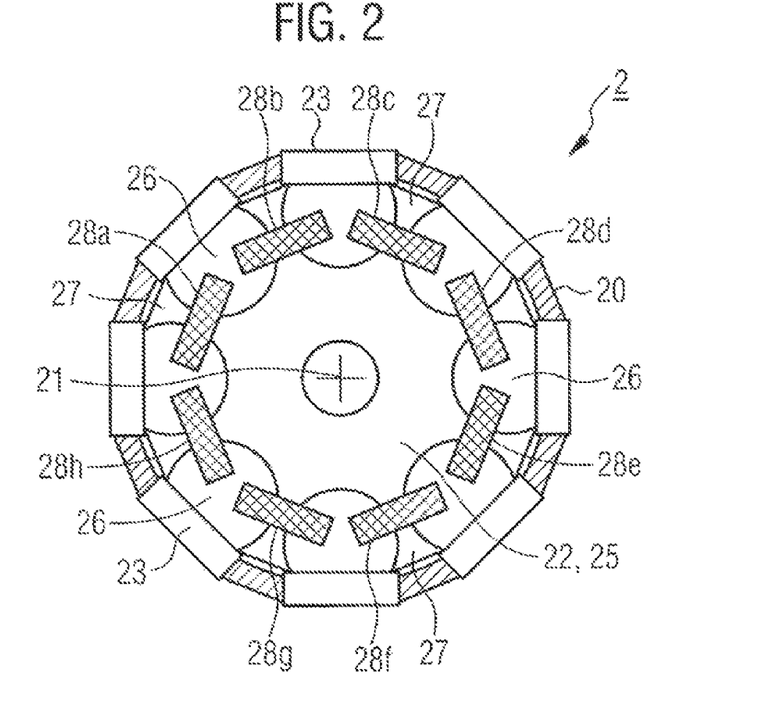
FIG. 2 is a schematic representation of the stator and rotor of the DC motor.

As is evident from FIG. 2, the motor 2 includes a stator 20 and a rotor 22 that is mounted therein such that it can rotate about a motor axis 21. The stator 20 consists of an essentially hollow, cylindrical lamination stack with eight permanent magnets 23 distributed uniformly about its inner circumference. Using technology that is conventional per se, the rotor 21 includes an iron core 25 that is approximately star-shaped in cross-section with eight slots 26 uniformly distributed about its circumference. A tooth 27 is formed between each pair of adjacent slots 26 in this design. Each of the eight teeth 27 is wound with an armature winding 28a-28h, through which the motor current $I_a$ flows during operation of the motor 2. In contrast to an ordinary DC motor, the motor 2 is provided with a fractional armature winding, which is to say that the armature windings 28a-28h have unequal numbers of turns. In the example shown in FIG. 2, winding 28a has 26 turns, winding 28b has 24 turns, windings 28c and 28d each have 25 turns, winding 28e has 27 turns, winding 28f has 26 turns, and windings 28g and 28h each have 25 turns.

As a result of the armature winding that is fractional in such a manner, undisturbed, static operation of the motor 2 produces a standard ripple pattern 29, which is depicted in FIG. 3 using the behavior over time of the AC component $E_W$ of the BEMF E. It is evident from FIG. 3 that the standard ripple pattern 29 has a total of four, current ripples R per half-cycle Z, which is to say per 180° rotation of the rotor 23. The number of current ripples R per half-cycle Z is referred to below as the "cycle ripple count $N_Z$" (here: $N_Z$=4). Three current ripples R in each half-cycle Z here have an at least approximately equal ripple amplitude $A_R$, corresponding to the applicable maximum value of the AC component $E_W$. These current ripples R are referred to below as "not distinguished" current ripples $R_N$. In contrast, the fourth current ripple R remaining in each half-cycle Z—visually highlighted in FIG. 3 by circles—has a significantly reduced ripple amplitude $A_R$ in comparison to the remaining current ripples R. This (smaller) current ripple R is thus distinguished relative to the current ripples $R_N$ and is referred to below as index ripple $R_I$. As is evident from FIG. 3, the standard ripple pattern 29 repeats with each half-cycle Z in undisturbed, static operation of the motor 2.

Figure 4:
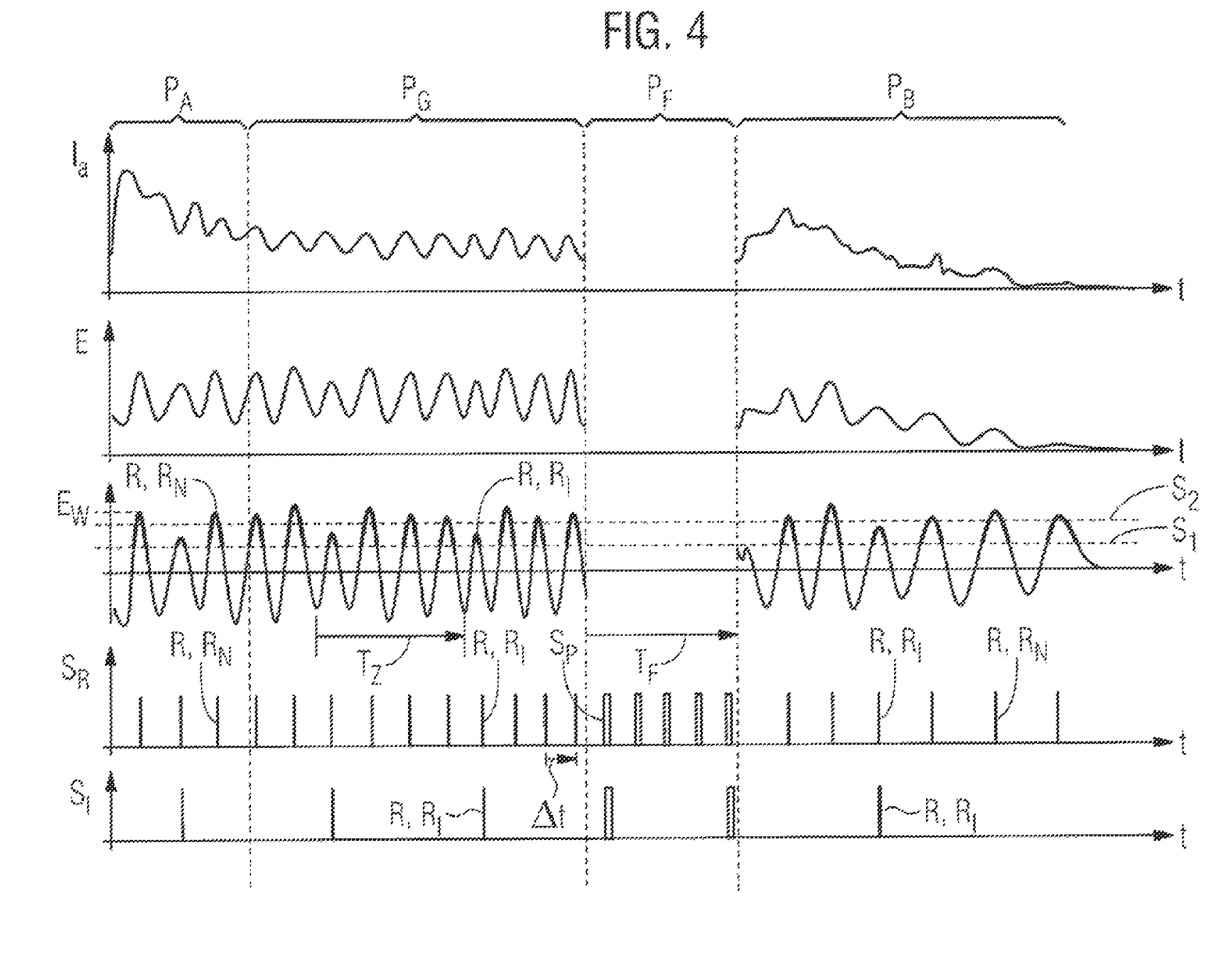
FIG. 4 illustrates in four synchronous diagrams over time arranged one above the other, the schematically simplified motor current of the DC motor during an actuation process, the BEMF derived from the motor current, an AC component of the BEMF, current ripple detection signals that indicate current ripples detected through analysis of this AC component, and index ripple detection signals that indicate index ripples detected through analysis of the AC component.

FIG. 4 shows, in a schematically simplified manner, the behavior of the motor current $I_a$, the BEMF E, the AC component $E_W$ of the BEMF E, the ripple detection signal $S_R$, and the index ripple detection signal $S_I$ as a function of time t during a typical actuation process. In particular, it is evident from the representation here that the actuation process is divided into the four phases described initially, namely the initial startup phase $P_A$, the equilibrium phase $P_G$, the freewheeling phase $P_F$, and the final braking phase $P_B$.

During the startup phase $P_A$, the equilibrium phase $P_G$, and the braking phase $P_B$, the detection module 14 increases (increments) or decreases (decrements) the motor position signal M by one count unit, namely by the value 1, for each received ripple detection signal $S_R$. The ripple detection signals $S_R$ thus act as count pulses for incrementing or decrementing the motor position signal M. In this context, the analysis module 14 starts from an initial value $M_0$ from which the motor position and the window position can be derived at the beginning of the actuation process. The arithmetic sign of the motor status signal $S_M$ here decides whether the motor position signal M is incremented or decremented. The motor position signal M is thus incremented during operation of the motor 2 in the first direction of motion, and is decremented during operation of the motor 2 in the opposite direction of motion:

$$M = \sum_{S_R} S_M + M_0 \text{ where } S_M = \pm 1 \qquad \text{Eq. 5}$$

Thus, in the actuation process shown by way of example in FIG. 4, the analysis module 14 increases the motor position signal M by the difference 19, initially without taking the freewheeling phase $P_F$ into account.

Since the motor current $I_a$ collapses, or at least exhibits extremely irreproducible behavior, during the freewheeling phase $P_F$, no current ripples R can be detected by the detection module 12 during the freewheeling phase $P_F$.

In order for the motor position signal M to be able to nonetheless track the actual motor position even in the freewheeling phase $P_F$, the analysis module 15 therefore supplements the current ripples that are not counted during the freewheeling phase $P_F$ by extrapolation based on the time sequence of the current ripples R before the beginning of the freewheeling phase $P_F$.

In an especially simple embodiment, the analysis module determines for this purpose the time interval $\Delta t$ between the last two current ripples R before the beginning of the freewheeling phase $P_F$, and generates a special count pulse $S_P$ each time this time interval $\Delta t$ elapses during the freewheeling phase F, with the motor position signal M being incremented or decremented on the basis thereof in place of the ripple detection signals $S_R$:

$$M = \sum_{S_P} S_M + M_0 \text{ where } S_M = \pm 1 \qquad \text{Eq. 6}$$

By means of the extrapolation described of the current ripples during the freewheeling phase $P_F$, the analysis unit 14 increases the motor position signal M by a total amount of 24 for the actuation process shown in FIG. 4 by way of example.

Despite the described extrapolation of the current ripples during the freewheeling phase $P_F$, it is possible, especially at the transition between the phases $P_G$, $P_F$, and $P_B$, for counting errors to occur as a result of unidentified current ripples R or erroneously identified current ripples. As shown in FIG. 4, such a counting error occurs by way of example at the transition between the freewheeling phase $P_F$ and the braking phase $P_B$, especially since only two instead of three not-distinguished current ripples $R_N$ are detected there between two index ripples $R_I$.

Any counting errors of this type are corrected by the analysis module 14 using the index ripple detection signal $S_I$ in a correction step that is described in detail below.

In a first embodiment of the correction step, during the actuation process and in parallel with the adaptation of the motor position signal M, the analysis module 14 continuously counts the number of current ripple detection signals $S_R$ that it receives during the time between two successive index ripple detection signals $S_I$ for the purpose of error correction. In this process, the analysis module 14 does not count current ripple detection signals $S_R$ that are received simultaneously with an index ripple detection signal $S_I$. The result of this counting, which below is called the interval ripple count $N_I$, thus reflects the number of (not-distinguished) current ripples $R_N$ detected between successive signatures of the index ripple $R_I$.

The correction step is based on recognition of the fact that, in the absence of a counting error, three not-distinguished current ripples $R_N$ must be detected between each two successive signatures of the index ripple $R_I$. Accordingly, the analysis module 14 always refrains from the correction when the interval ripple count $N_I$ has the value 3.

If a (not-distinguished) current ripple $R_N$ erroneously is not detected, then the analysis module 14 counts only two current ripple detection signals $S_R$ between two successive index ripple detection signals $S_I$ ($N_I$=2). In contrast, if a current ripple is detected erroneously, then the analysis module 14 counts four current ripple detection signals $S_R$ between two successive index ripple detection signals $S_I$ ($N_I=4$).

In the case where an index ripple $R_I$ is either not detected or is erroneously detected as a not-distinguished current ripple $R_N$, the analysis module 14 counts six or seven current ripple detection signals $S_R$ between two successive index ripple detection signals $S_I$ ($N_I=6$ or $N_I=7$). In the latter case, however, there is no need for correction, since the total number of detected current ripples R is sensed correctly.

For counting error correction, the analysis module 14 accordingly produces a correction value K with the value:
K=0, when $N_I=N_Z-1=3$
K=+1, when $N_I=N_Z-2=2$
K=+2, when $N_I=N_Z-3=1$
K=−1, when $N_I=N_Z=4$
K=+1, when $N_I=2\cdot(N_Z-1)=6$
K=0, when $N_I=2\cdot N_Z1=7$.

The interval ripple count $N_I$ is re-analyzed by the analysis module 14 with each received index ripple detection signal $S_I$, and then reset to zero. In doing so, the analysis module 14 changes the motor position signal M by the correction value:

$$M \rightarrow M + S_M \cdot K \qquad \text{Eq. 7}$$

with each index ripple detection signal $S_I$. Thus, the motor position signal M is corrected regularly after each half-cycle Z if a counting error has occurred.

In an alternative embodiment of the correction step, the analysis module 14 counts, as interval ripple count $N_I$, the number of current ripples R that are received between the first ripple detection signal $S_I$ received during the actuation process and the last index ripple detection signal $S_I$ detected during the actuation process. The ripple detection signal $S_R$ received simultaneously with the last index ripple detection signal $S_I$ of the actuation process is counted here in order to simplify the numeric analysis. In addition, when determining the interval ripple count $N_I$ in this case, the analysis module 14 counts the special count pulse $S_P$ generated during the freewheeling phase $P_F$.

For the counting error correction here, the analysis module 14 first forms the ratio V of the interval ripple count $N_I$ thus determined and the cycle ripple count $N_Z$, as well as the fractional part $V_{NK}$ of this ratio V.

Here, the correction step is based on the knowledge that, in the absence of a counting error, the ratio V must always be an integer. In other words, in the absence of a counting error the fractional part $V_{NK}$ must have the value zero.

In contrast, if a current ripple R erroneously goes undetected, then in the case of a cycle ripple count $N_Z=4$ a fractional part $V_{NK}=0.75$ always results. In particular, in the example shown in FIG. 4 the analysis module 14 determines, for an interval ripple count $N_I=19$ for the ratio V:

$$V = \frac{N_I}{N_Z} = \frac{19}{4} = 4.75 \qquad \text{Eq. 8}$$

with the fractional part $V_{NK}=0.75$.

If one current ripple too many is erroneously counted, then in the case of a cycle ripple count $N_Z=4$ a fractional part $V_{NK}=0.25$ always results accordingly. If two current ripples too few or too many are counted during an actuation process, then the fractional part $V_{NK}$ always has the value 0.5.

Accordingly, the analysis module 14 here generates a correction value K with the value:
K=0, when $V_{NK}=0$
K=+1, when $V_{NK}=0.75$,
K=−1, when $V_{NK}=0.25$, and
K=+2, when $V_{NK}=0.5$,
and adjusts the motor position signal M in accordance with equation 7.

In particular, in the case of a fractional part $V_{NK}=0.5$, the analysis module 14 always corrects the number of counted current ripples R upward, since according to experience the probability that two current ripples R remain undetected during an actuation process is significantly higher than the probability that two current ripples R too many are counted during an actuation process.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A method for determining an actuating quantity of a mechanically commutated DC motor in an actuating device for a motor vehicle, wherein the DC motor has, as a result of mechanical or electromechanical modification, a standard ripple pattern that includes at least one index ripple in each motor cycle or motor half cycle that is distinguished with respect to an amplitude, a duration, and/or a position in time, the method comprising:
    measuring the motor current and the motor voltage during an operation of the DC motor;
    calculating a back electromotive force from the measured motor current and the measured motor voltage via a motor model;
    extracting an AC component corresponding to the current ripples from the back electromotive force;
    detecting the current ripples from the AC component;
    identifying the index ripple in at least one motor cycle or motor half cycle;
    counting all of the identified current ripples as a measure of the actuating quantity or a change therein; and
    correcting the count result when the index ripple is not counted at the expected position.

2. The method according to claim 1, wherein the correction is carried out each time the index ripple is detected.

3. The method according to claim 1, wherein the correction is carried out exactly once per actuation process.

4. The method according to claim 1, wherein the standard ripple pattern has precisely one index ripple per motor cycle or motor half cycle, wherein the number of current ripples between two successive signatures of the index ripple is ascertained as the interval ripple count, wherein the count result that is determined as a measure of the actuating quantity or the change therein is corrected upward by one count unit when the interval ripple count corresponds to the ripple count per motor cycle or motor half cycle of the standard ripple pattern decreased by two count units, and wherein this count result is corrected downward by one count unit when the interval ripple count corresponds to the ripple count per motor cycle or motor half cycle of the standard ripple pattern.

5. The method according to claim 1, wherein the standard ripple pattern has precisely one index ripple per motor cycle or motor half cycle, wherein the number of current ripples between the signature of the index ripple identified in an earlier motor cycle or motor half cycle and the signature of the index ripple identified in a later motor cycle or motor half cycle, including in the count the latter signature of the index ripple, is determined as the interval ripple count, wherein the count result that is determined as a measure of the actuating quantity or the change therein is corrected upward when the fractional part of the ratio of the interval ripple count to the ripple count per motor cycle or motor half cycle of the standard ripple pattern is at least 0.5, and wherein this count result is corrected downward when the fractional part is greater than 0 but less than 0.5.

6. The method according to claim 1, wherein the count result that is determined as a measure of the actuating quantity or the change therein is adapted during the freewheeling phase of each actuation process through extrapolation using the current ripples identified before and/or after the freewheeling phase.

7. An actuating device for a motor vehicle having a mechanically commutated DC motor, which due to mechanical or electromechanical modification has a standard ripple pattern that includes at least one index ripple in each motor cycle or motor half cycle that is distinguished with respect to an amplitude, a duration, and/or a position in time, and also having a control unit for controlling the DC motor, wherein the control unit is configured to determine an actuating quantity of the motor using the method according to claim 1.

8. The actuating device according to claim 7, wherein the DC motor has a standard ripple pattern that has precisely one index ripple and also at least three not-distinguished current ripples in each motor cycle or motor half cycle.

9. A method of using a mechanically commutated DC motor, which due to mechanical or electromechanical modification has a standard ripple pattern that includes at least one index ripple in each motor cycle or motor half cycle that is distinguished with respect to an amplitude, a duration, and/or a position in time, for correction of counting errors in determining an actuating quantity of the DC motor by counting current ripples using the method according to claim 1.

10. The method according to claim 1, wherein the actuating quantity is a motor position or an actuation distance.

* * * * *